(12) United States Patent
Bardell et al.

(10) Patent No.: US 11,814,286 B2
(45) Date of Patent: Nov. 14, 2023

(54) BACKUP POWER SYSTEM WITH CONTROLLER

(71) Applicant: Caterpillar Inc., Peoria, IL (US)

(72) Inventors: Michael Bardell, Peoria, IL (US); David T. Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/585,098

(22) Filed: Jan. 26, 2022

(65) Prior Publication Data

US 2023/0234845 A1 Jul. 27, 2023

(51) Int. Cl.
*C01B 3/32* (2006.01)
*C01B 3/52* (2006.01)

(52) U.S. Cl.
CPC .............. *C01B 3/323* (2013.01); *C01B 3/52* (2013.01); *C01B 2203/0233* (2013.01); *C01B 2203/04* (2013.01); *C01B 2203/1011* (2013.01); *C01B 2203/1223* (2013.01); *C01B 2203/1685* (2013.01); *C01B 2203/84* (2013.01)

(58) Field of Classification Search
CPC .... C01B 2203/0233; C01B 2203/1223; C01B 2203/1685
See application file for complete search history.

(56) References Cited

U.S. PATENT DOCUMENTS

| | | | |
|---|---|---|---|
| 6,057,261 A | 5/2000 | Sun | |
| 6,322,917 B1 * | 11/2001 | Acker | B01J 19/0006 429/432 |
| 6,802,875 B1 * | 10/2004 | Kimbara | C01B 3/26 48/85.1 |
| 8,188,322 B2 | 5/2012 | Shaw | |
| 2002/0045077 A1 * | 4/2002 | Kotani | H01M 8/04776 429/412 |
| 2004/0255514 A1 * | 12/2004 | Sakakida | C01B 3/386 422/111 |
| 2009/0087706 A1 * | 4/2009 | Gil | H01M 8/04089 429/508 |

(Continued)

FOREIGN PATENT DOCUMENTS

| CN | 209081421 U | 7/2019 |
|---|---|---|
| CN | 110775941 | 2/2020 |

(Continued)

OTHER PUBLICATIONS

UK Combined search report and Examination Report for UK Patent Appln. No. 2219822.0, dated Jun. 30, 2023 (7 pgs).

*Primary Examiner* — Imran Akram
(74) *Attorney, Agent, or Firm* — Lee & Hayes, P.C.

(57) ABSTRACT

A system is disclosed. The system can store a fuel reagent such as methanol for conversion into hydrogen to power one or more facility systems via a backup power system. A reactor controller can monitor a power demand of the one or more facility systems and determine whether the power demand is met by a primary power system. The fuel reagent can be provided to a fuel reactor in response to the reactor controller determining that the one or more facility systems are operating at a power deficit to generate an amount of hydrogen that, when provided to the backup power system, causes the backup power system to generate an amount of power that meets or exceeds the power deficit.

13 Claims, 5 Drawing Sheets

(56) References Cited

U.S. PATENT DOCUMENTS

| | | | | |
|---|---|---|---|---|
| 2009/0092883 A1* | 4/2009 | Ozeki | ............... | H01M 8/04373 |
| | | | | 429/425 |
| 2010/0136441 A1* | 6/2010 | Mori | ..................... | C01F 5/24 |
| | | | | 252/188.25 |
| 2012/0208099 A1* | 8/2012 | Chen | .................... | C01B 3/384 |
| | | | | 423/650 |
| 2014/0323600 A1 | 10/2014 | Jennings | | |
| 2021/0376361 A1* | 12/2021 | Dionne | ................ | H01M 8/12 |

FOREIGN PATENT DOCUMENTS

| | | | |
|---|---|---|---|
| CN | 111564884 | A | 8/2020 |
| WO | 2005004256 | A2 | 1/2005 |
| WO | 2006008138 | A1 | 1/2006 |

\* cited by examiner

BACKUP POWER SYSTEM WITH CONTROLLER

TECHNICAL FIELD

The present disclosure relates to systems and methods for handling fluids at that are convertible to generate fuel for a power system. More specifically, the present disclosure relates to systems and methods for storing safely and efficiently storing a volatile fuel as a non-volatile fuel reagent.

BACKGROUND

Large-scale facilities such as data centers consume large amounts of energy and require backup equipment to ensure there is enough power to complete essential tasks in the event of power loss. Conventionally, diesel generator sets or "gensets" are used to provide backup power to large-scale facilities. Increasingly, Hydrogen ($H_2$) fuel cells and engines are being considered for this purpose, but they present their own challenges. The fuel for such engines is stored at cryogenic temperatures and/or elevated pressures until the backup power is needed. Cryogenic fluids are typically stored in tanks that passively maintain the stored fluids at extremely cold temperatures. In most cases it is considered inefficient to actively cool the fluids stored within such passive storage tanks, and as a result, other systems are often used to cool these fluids before they are put into the tanks. Passive storage tanks are of course imperfect, and the cryogenic fluid stored within such tanks will warm and increase in pressure gradually over time. When such warming occurs, at least some of the stored $H_2$ will need to be released as "boil-off" in order to maintain safe pressure in the tanks. As this happens, the gas generated via boil-off can be vented into the atmosphere to maintain safe storage pressures. In some cases, $H_2$ may boil-off at a rate of up to approximately 1% per day or more, meaning that without a way to address the boil-off, the $H_2$ will need to be completely replaced approximately every 100 days. Alternatively, compressed $H_2$ can be stored in reinforced tanks. However, as hydrogen does not liquify under reasonable pressures, compressed $H_2$ remains in the gaseous phase and utilizes larger tank volumes to store an effective volume of fuel. Accordingly, storage of $H_2$ via cryogenic liquefaction or via compression results in either extensive tank volumes and/or maintenance equipment to maintain cryogenic temperatures.

As noted above, hydrogen can present certain challenges for storage: it is volatile, and the liquification temperature is low (approximately 33 degrees Kelvin). As such, it can be difficult to maintain the hydrogen in a safe, efficient way so that it can be used as fuel or in other applications. Naturally, in any storage system there is a tendency for the hydrogen to warm and even vaporize. As this happens, an internal pressure of a tank increases and, if left unchecked, will exceed containment measures. Accordingly, the internal pressure can cause the tank to rupture and lead to damage to the surround facility, equipment, personnel, and/or assets. Further, the flammability of hydrogen poses safety hazards.

One system for converting methanol into hydrogen for utilization as a power source is disclosed in Chinese Patent No. 110,775,941 (hereinafter referred to as "the '941 reference"). The '941 reference discloses extracting hydrogen from methanol for utilization in energy generation. As explained in the '941 reference, the system passes methanol steam into a reformer to extract hydrogen from the methanol and then pass the gases output by the reformer to a hydrogen separation device. The '941 reference discloses separating hydrogen from carbon dioxide and carbon monoxide produced by the reformer and providing the hydrogen to a storage system before utilizing the hydrogen to generate power.

Although the system described in the '941 reference may be configured to generate hydrogen from a mixture of methanol and water, the system requires the use of a hydrogen storage system due to the production hydrogen being independent of the power demand for associated systems. As noted above, the storage of hydrogen introduces problems due to the difficulties in maintain cryogenic temperatures and/or sufficiently high pressures. Such components increase the cost and complexity of the system. Thus, the system described in the '941 reference, and other similar systems, utilize methanol as a hydrogen source while maintaining fuel storage systems for the hydrogen. Additionally, the system described in the '941 reference also suffers from inefficiencies related to producing hydrogen independent of the energy needs of the associated systems, resulting is exceed hydrogen being vented and/or otherwise lost.

Examples of the present disclosure are directed toward overcoming one or more of the deficiencies noted above.

SUMMARY OF THE INVENTION

Examples of the present disclosure are directed to a system that comprises a storage tank, a reagent mixer, a reactor, a backup power system, and a controller. The storage tank can be configured to store methanol, the storage tank including an outlet valve operable to fluidly connect the storage tank with an output line. The reagent mixer can be fluidly connected to the output line and a water line, the reagent mixer being configured to form a feed solution by combining methanol received via the output line and water received via the water line. Additionally, the reactor can be fluidly connected to the reagent mixer, the reactor being configured to: receive the feed solution from the reagent mixer and extract hydrogen from the feed solution. Further, the backup power system can be fluidly connected to the reactor such that the backup power system receives the hydrogen from the reactor and converts the hydrogen into power. Accordingly, the controller can be configured to determine a power demand of a facility system exceeds a power supply of a primary power system associated with the facility system by a first amount of power; determine a first amount of the hydrogen that, when supplied to the backup power system, causes the backup power system to generate a second amount of power greater than or equal to the first amount of power; determine, based on the first amount of hydrogen, a first amount of methanol that, when supplied to the reactor, causes the reactor to extract the first amount of hydrogen from the feed solution; cause the outlet valve to direct the first amount of methanol to the reagent mixer, the mixer forming a first amount of the feed solution using the first amount of methanol; cause the reactor to extract the first amount of hydrogen from the first amount of the feed solution and direct the first amount of hydrogen to the backup power system; and cause the backup power system to generate the second amount of power using the first amount of hydrogen.

Further examples of the present disclosure are directed to a method for maintaining operation of facility systems. The method may include determining that a power demand of a facility system is greater than a power supply of a primary power system. Additionally, the method may include determining, based on the power demand exceeding the power supply, a first amount of power that the primary power system is unavailable to satisfy at a first time. Further, the method may include determining a first amount of hydrogen that, when supplied to a backup power system, causes the backup power system to generate a second amount of power greater than or equal to the first amount of power. The method may include determining, based at least on the first amount of hydrogen, a first amount of methanol that, when supplied to a reactor, causes the reactor to extract the first amount of hydrogen. Accordingly, the method may include causing the first amount of methanol to be obtained from a storage tank and water to be obtained from a water source, wherein the first amount of methanol and the water are provided to the reactor. Similarly, the method may include causing the reactor to extract the first amount of hydrogen from the first amount of methanol and the water and direct the first amount of hydrogen to the backup power system. Further, the method may include causing the backup power system to generate the second amount of power from the first amount of hydrogen.

Still further examples of the present disclosure are directed to a system that comprises one or more processors and a memory storing instructions that are executable by the one or more processors to perform operations. The operations may include determining that a power demand of a facility system exceeds a power supply of a primary power system. Similarly, the operations may include determining, based on the power demand exceeding the power supply, a first amount of power that the primary power system is unavailable to satisfy at a first time. Additionally, the operations may include determining a first amount of hydrogen that, when supplied to a backup power system, enables the backup power system to generate a second amount of power greater than or equal to the first amount of power. Further, the operations may include determining, based at least on the first amount of hydrogen, a first amount of fuel reagent that, when supplied to a reactor, causes the reactor to extract the first amount of hydrogen. Accordingly, the operations may cause the first amount of fuel reagent to be obtained from a storage tank and an additional reagent to be obtained from a reagent source, wherein the first amount of fuel reagent and an additional regent are provided to the reactor. Similarly, the operations may cause the reactor to extract the first amount of hydrogen from the first amount of fuel reagent and the additional reagent and direct the first amount of hydrogen to the backup power system. Further, the operations may cause the backup power system to generate the second amount of power from the first amount of hydrogen.

DETAILED DESCRIPTION

Figure 1:
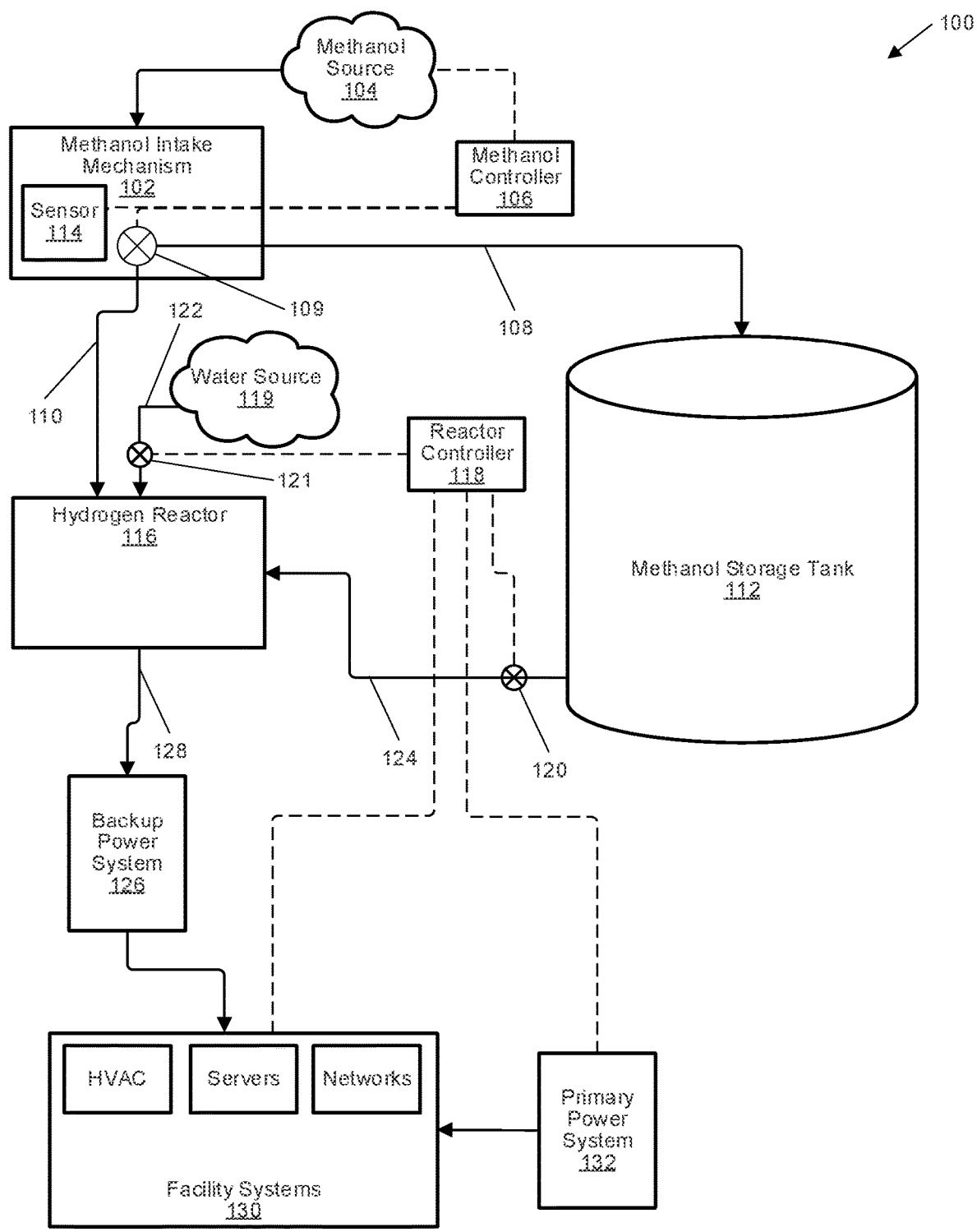
FIG. 1 is a schematic illustration of a methanol to hydrogen conversion system that stores and maintains methanol for conversion to hydrogen according to examples of the present disclosure.

FIG. 1 is a schematic illustration of a methanol to hydrogen conversion system that stores and maintains methanol for conversion to hydrogen, and to fuel a back-up power system, according to examples of the present disclosure. The methanol to hydrogen conversion system 100, while described in the context of utilizing methanol as a fuel reagent, can be used with any fuel reagent in any phase or combination of phases, and at a variety of temperatures and pressures depending on the particular application of the fuel reagent and the type of fuel as each case may require. Methanol is one such fuel reagent that can be stored and maintained by the methanol to hydrogen conversion system 100. It is to be appreciated that other fuel reagents may also be used with the methanol to hydrogen conversion system 100 according to the present disclosure, and that any specific reference to methanol does not limit the scope of the present disclosure to any fuel reagent. Further, hydrogen is one such fuel that can be generated and provided by the methanol to hydrogen conversion system 100. For example, other fuel reagents may include other alcohols (e.g., ethanol, propanol, etc.), hydrocarbons, ketones, and other hydrogen storing compounds.

As shown in FIG. 1, the example methanol to hydrogen conversion system 100 includes a methanol intake mechanism 102 fluidly connected to a methanol source 104. The methanol intake mechanism 102 can be a coupling and/or a valve that is fluidly connected to the methanol source 104 and enables methanol to be provided to the methanol to hydrogen conversion system 100. For example, the methanol intake mechanism 102 can be a quick disconnect coupling and an intake line that fluidly connects to the methanol source 104, a fluid pump that is operable to extract methanol from the methanol source 104, and/or a valve that is operable to regulate the flow of methanol from the methanol source 104. Additionally, the methanol source 104 can be a methanol line that transports methanol to the methanol intake mechanism 102 from an off-site location and/or a methanol tank that enables methanol to be brought to and/or otherwise provided to the methanol to hydrogen conversion system 100. For example, the methanol source 104 can be a tank railcar that stores methanol for transfer via the methanol intake mechanism 102, a tank transported by tractor-trailer, or a chemical reactor that generates methanol from one or more reagents. Further, the methanol to hydrogen conversion system 100 can include a methanol controller 106 that is associated with the methanol intake mechanism 102. The methanol controller 106 can be a server, a computing device, and/or other processing device that is configured to operate the methanol intake mechanism 102 (e.g., one or more pump, valves, and/or other fluid control components) to direct methanol from the methanol source 104 to various components of the methanol to hydrogen conversion system 100. For example, the methanol controller 106 may be configured to direct methanol from the methanol source 104, via an input line 108, one or more valves 109, and/or other components of the methanol intake system 102 to a methanol storage tank 112. The methanol controller 106 may also be configured to direct methanol from the methanol source 104, via an input line 110, one or more valves 109, and/or other components of the methanol intake system 102 to a hydrogen reactor 116 of the methanol to hydrogen conversion system 100. Further, the methanol controller 106 can be configured to regulate incoming methanol from the methanol source 104 and to facilitate routing the incoming methanol to one or more components or destinations.

The methanol intake mechanism 102 can be any suitable mechanism by which methanol (or another fuel reagent) can be injected into and/or received by the methanol to hydrogen conversion system 100. In some examples, the methanol source 104 can include the methanol line or a methanol tank that provides the methanol to the methanol to hydrogen conversion system 100 independent of the utilization of the methanol to generate hydrogen. Additionally, the methanol source 104 can provide methanol at an intake pressure, intake temperature, and/or an intake flow rate that is received by the methanol intake mechanism 102. In addition to the one or more valves 109 described above, the methanol intake mechanism 102 can include one or more regulation components (not shown) that are configured to control the pressure and/or flow of methanol into the methanol to hydrogen conversion system 100 from the methanol source 104. In some examples, such regulation components may include one or more pumps (e.g., mechanisms configured to cause fluid flow, generate pressure differentials, and otherwise apply work to the fluid), control valves (e.g., valves that are configured to open to permit fluid flow and close to restrict fluid flow in response to a received signal and/or an applied force), throttling valves (e.g., valves that are utilize to control fluid flow rates and system pressure), and/or other pressure control or flow control components. In some additional examples, methanol received from the methanol source 104 can be in a mixed phase solution, in a gaseous state, or in a liquid state. Accordingly, the methanol intake mechanism 102 can be configured to handle input fluids associated different phase states, to separate the gaseous phase from the liquid phase, and to route different phase states to the appropriate portion of the methanol to hydrogen conversion system 100. As noted above, in some examples the methanol source 104 can be a chemical reactor that carries out a chemical process for generating methanol (e.g., a chemical process where hydrocarbons and/or other compounds are reacted with a substance to produce at least methanol) and/or other synthesis process for generating methanol. Additionally, methanol can be produced by a chemical reaction associated with such a process, and can be supplied via the methanol intake mechanism 102. It should be noted that the methanol intake mechanism 102 can receive methanol in any form and facilitate input into the methanol to hydrogen conversion system 100.

The methanol controller 106 can be configured to control, either remotely via electronic inputs or directly via servos/motors, the methanol intake mechanism 102 to regulate the methanol received from the methanol source 104. The pumps, valves, and other fluid regulating components of the methanol intake mechanism 102 and/or the methanol source 104 can operably connected to the methanol controller 106, and the methanol controller 106 is programmed and/or otherwise configured to provide control commands or other instructions to such components in order to facilitate delivery of methanol from the methanol source 104 to the methanol storage tank 112. Additionally, the methanol controller 106 can receive indications of methanol flow rate, temperature, pressure, and other physical properties from one or more sensors 114 (e.g., temperature sensor(s), pressure sensor(s), and flow sensor(s) that are components of the methanol intake mechanism 102) that generate the one or more indications from the methanol received from the methanol source 104. The one or more indications can be utilized for the regulation and routing of the methanol to the methanol storage tank 112 (e.g., modulating the temperature, pressure, and/or flow rate of the methanol before storage of the methanol) and/or to the hydrogen reactor 116. Alternatively, or in addition, the methanol intake mechanism 102 can involve a delivery service (e.g., methanol is provided to the methanol to hydrogen conversion system 100 via a tank transported by rail and/or via truck) such as a vendor of methanol that provides the methanol at a known pressure and a known temperature.

In some examples, FIG. 1 is an illustration of the methanol to hydrogen conversion system 100 for a facility according to examples of the present disclosure. In particular, the methanol to hydrogen conversion system 100 can be configured to store a fuel reagent (e.g., methanol) in the methanol storage tank 112 for conversion into a fuel (e.g., hydrogen) by the hydrogen reactor 116. The methanol storage tank 112 and the hydrogen reactor 116 can be controlled and/or operated by a reactor controller 118. For example, the reactor controller 118 can be operably connected to a methanol line valve 120 that is configured to control a flow of methanol from the methanol storage tank 122 to the hydrogen reactor 116 via a methanol line 124. Similarly, the reactor controller 118 can be operably connected to a water line valve 121 that is configured to control a flow of water from the water source 119 to the hydrogen reactor 116 via a water line 126. In such examples, fuel (e.g., hydrogen) that is generated by the hydrogen reactor 116 can be directed from the hydrogen reactor 116 to a backup power system 126 via a fuel line 128 fluidly connected to the backup power system 126. In such examples, the fuel line 128 is fluidly connected to the hydrogen reactor 116 and the backup power system 126, and it is understood that one or more valves, pumps, or other flow control components (not shown) may be included in the methanol to hydrogen conversion system 100 to control the flow of hydrogen and/or other fluids from the hydrogen reactor 116 to the backup power system 126.

Due to the complexities of storing hydrogen (e.g., requiring boil-off mitigation systems, liquefaction system for cryogenic fluids, high-pressure storage tanks, etc.), utilizing a fuel reagent can enable the facility to store an effective amount of fuel for the backup power system 126 that is greater than the amount of hydrogen that can be stored in an equivalent volume. Further, the methanol to hydrogen conversion system 100 can maintain the fuel reagent as a power reserve in the event that power demands of one or more facility systems 130 to which the backup power system 126 is connected, are not met by a dedicated or primary power system 132 associated with the facility systems 130. In some examples, the primary power system 132 can be a power grid that is maintained by a local municipality or another source of primary power. Additionally, the facility systems 130 have a power demand that is determined based at least on the power consumed by various systems within a facility. For example, where the facility is a cloud computing facility, the facility systems 130 can include a plurality of servers that execute computing commands, a network system that receives computing requests from remove devices and provides computing results to the remote devices, and utilities associated with the facility (e.g., cooling, lighting, etc.). Accordingly, the power demand of the facility systems 130 can include the power requirements of any and all powered HVAC systems, lights, heating systems, cooling systems, motors, engines, networks, servers, other computing devices, and virtually any other mechanism that consumes electrical power within the facility. While the example facility systems 130 shown in FIG. 1 include HVAC, servers, and networks, it is understood that in additional examples, the facility systems 130 described herein may include greater than, fewer than, or different parasitic components than those illustrated in FIG. 1.

The methanol storage tank 112 can be configured to store a volume of methanol sufficient to operate the facility systems 130 for a period of time (e.g., one day, two days, a week, etc.). In particular, the methanol tank 112 can have one or more sidewalls (e.g., cylindrical tank, cuboid tank, spherical tank, etc.), a top wall, and a bottom wall that are connected to form a substantially fluid-tight container that prevents the fuel reagent (e.g., methanol) from leaking, spilling, and/or otherwise escaping the methanol storage tank 112. Additionally, the methanol storage tank 112 can be fluidly connected to the input line 108 and the methanol line 124. The methanol line 124 can fluidly connect the methanol storage tank 112 with the hydrogen reactor 116, wherein flow of methanol through the methanol line 124 can be controlled by the reactor controller 118 operating the methanol line valve 120. Accordingly, the reactor controller 118 can open and close the methanol line valve 120 to permit the amount of methanol to be transferred from the methanol storage tank 112 to at least the hydrogen reactor 116.

The water source 119 can be configured to provide an additional reagent (e.g., water) to the hydrogen reactor 116. In particular, the water source 119 can be a water tank, a water line that is connected and supplies water from a municipal source, a natural body of water, and/or other source of water. As noted above, water can be provided from the water source 119 to the hydrogen reactor 116 via the water line 122, and the reactor controller 118 can open and close the water line valve 121 to permit a desired amount of water to be transferred from the water source 119 to at least the hydrogen reactor 116.

In some examples, the hydrogen reactor 116 can be configured as a catalyst bed reactor that converts methanol, in combination with water, to hydrogen. It should be noted that in some additional examples, the hydrogen reactor 116 may be a conversion reactor that is configured to convert a fuel reagent and, optionally, an additional reagent into a fuel. The hydrogen can be provided from the hydrogen reactor 116 to the backup power system 126 where the hydrogen is consumed to produce an amount of power sufficient to meet and/or exceed the power demand of the facility systems 130. The backup power system 126 can be configured to produce the amount of power to supplement the power provided by the primary power system 132 and/or to power the facility systems 130 in place of the primary power system 132. Additionally, the backup power system 126 can be a hydrogen fuel cell system, a hydrogen generator system, and/or other system that consumes hydrogen (or other fuel) to produce the amount of power.

In some additional examples, the methanol to hydrogen conversion system 100 can manage the production of the fuel for the backup power system 126 in the event of a power failure, shortage, or other circumstance that results in power demands of the facility systems 130 not being satisfied by the primary power system 132. In some examples, the backup power system 126 can include hydrogen-powered engine(s) and/or fuel cell(s) that convert hydrogen (or other cryogenic fuels) into sufficient energy to satisfy the power demands of the facility systems 130. Accordingly, upon determining that power demands are not being satisfied by the primary power system 132, the facility and/or the backup power system 126 can cause hydrogen to be generated from the methanol stored by the methanol storage tank 112 to produce additional power for the facility systems 130.

In some examples, the reactor controller 118 can be configured to determine whether the power demand of the facility systems 130 is satisfied by the power supply of the primary power system 132. In particular, the reactor controller 118 can be a server, a computing device, and/or other system that contains a processor configured to receive indications associated with operation of the facility systems 130 and ensure that the facility systems 130 are sufficiently powered. Additionally, the reactor controller 118 can determine that the facility systems 130 are operating at a power deficit when the power demand of the facility systems 130 exceeds the power supply of the primary power system 132. Further, the reactor controller 118 can determine an amount of hydrogen that, when provided to the backup power system 126, causes the backup power system 126 to generate sufficient power to meet or exceed the power deficit for the facility systems 130.

In some example, the reactor controller 118 can determine the amount of hydrogen to meet or exceed the power deficit of the facility systems 130 and cause the hydrogen reactor 116 to generate the amount of hydrogen. In particular, the reactor controller 118 can be operably connected to fluid control devices associated with the methanol storage tank 112 (e.g., the methanol line valve 120) and/or the water source 119 (e.g., the water line valve 121). In such examples, the reactor controller 118 may control the methanol line valve 120 to direct a desired amount of methanol to the hydrogen reactor 116. The reactor controller 118 may also control the water line valve 121 to direct a desired an amount of water to the hydrogen reactor 116. In any of the examples described herein, the desired amount of methanol and the desired amount of water are determined by the reactor controller 118 such that, when provided to the hydrogen reactor 116, the hydrogen reactor 116 may generate at least the amount of hydrogen sufficient to meet or exceed the power deficit of the facility systems 130. More specifically, the amount of methanol and the amount of water are determined by the reactor controller 118 based on a reaction conversion efficiency (e.g., the percentage of methanol that is effectively converted into hydrogen by the hydrogen reactor 116) to cause the hydrogen reactor 116 to output the amount of hydrogen for the backup power system 126. For example, methanol can be utilized to generate hydrogen through the below overall reaction (1) and the sub-reactions (2)-(4).

$$CH_3OH + H_2O \rightarrow 3H_2 + CO_2 \tag{1}$$

$$CH_3OH \rightarrow HCHO + H_2 \tag{2}$$

$$HCHO + H_2O \rightarrow HCOOH + H_2 \tag{3}$$

$$HCOOH \rightarrow CO_2 + H_2 \tag{4}$$

In some examples, the reactor controller 118 can be configured to determine an expected yield for the hydrogen reactor 116 that meets or exceeds the amount of hydrogen, the expected yield indicating the amount of hydrogen that is generated from the amount of methanol. More specifically, the expected yield accounts for side reactions that cause the amount of methanol to be incompletely converted into hydrogen. As a result, the amount of hydrogen may be less than a total amount of hydrogen available due to a portion of the methanol being consumed by side reactions that at least prevent hydrogen from being extracted from the portion of methanol. Accordingly, the reactor controller 118 can utilize reaction models to determine the amount of methanol that, via the effective yield, produces the amount of hydrogen for the backup power system 126. Additionally, the amount of methanol determined by the reactor controller 118 can be utilized to determine the amount of water that is provided to the hydrogen reactor 116. It should be noted that the amount of water can be a minimum amount of water that is to be provided to the hydrogen reactor 116 to generate the amount of hydrogen. Alternatively, or in addition, the reactor controller may cause excess water to be provided in addition to the amount of water to ensure substantially complete conversion of the amount of methanol to the amount of hydrogen.

It should be noted that the water source 119 can be configured as and/or may otherwise include a variety of systems for providing water to the hydrogen reactor. Additionally, the water source 119 can include a filtration and/or purification system that removes impurities from the water received from the water source 119 to prevent fouling and/or other contamination of the hydrogen reactor 116 (e.g., the impurities may cause fouling of the hydrogen reactor 116, increase the amount of side reactions that consume methanol, etc.). The water source 119 can be a water storage tank, a water valve that is connected to off-site water (e.g., municipal water lines, ground water pumps, etc.), and/or natural water source (e.g., lakes, rivers, oceans, etc.). For example, when the methanol to hydrogen conversion system 100 is utilized to provide power to a data center, the water source 119 may comprise and/or may otherwise utilize a municipal water line. In other examples in which the methanol to hydrogen conversion system 100 is utilized to provide power to a locomotive engine, the water source 119 may comprise and/or may otherwise utilize a water tank. In still further examples in which the methanol to hydrogen conversion system 100 is utilized to provide power to a ship, boat, or other sea vessel, the water source 119 may comprise and/or may otherwise utilize water pumped in from a body of water surrounding the ship. Accordingly, the water source 119 may be configured to obtain and/or process the amount of water (e.g., purification, filtration, distillation, desalination, etc.) before the amount of water is directed to the hydrogen reactor 116 via the water line 122.

In some examples, the hydrogen reactor 116 may receive the amount of methanol via the methanol line 124 and the amount of water via the water line 122 and output the amount of hydrogen via the fuel line 128. In particular, the hydrogen reactor 116 may receive the methanol and/or the water at substantially ambient temperature (e.g., approximately 70° F.). Alternatively, or in addition, the hydrogen reactor 116 may receive the methanol and/or the water at a reactor temperature that is associated with a conversion reaction and enables the methanol to be converted into hydrogen. The hydrogen reactor 116 may receive the amount of methanol and/or the amount of water after heating systems (e.g., heating coils, heat exchangers, etc., not shown) have been utilized to elevate a fluid temperature from ambient temperature to the reactor temperature (e.g., heating the methanol and the water to 200° C., 300° C., etc.). In some examples, such heating systems may be fluidly and/or thermally connected to the water line 122 and/or to the methanol line 124. Depending on the configuration of, for example, a catalyst bed utilized by the hydrogen reactor 116, the reactor temperature can be determined to enable the amount of methanol to be converted into the amount of hydrogen at the effective yield. More specifically, the conversion reaction of methanol to hydrogen can be associated with an activation energy that enables the methanol to be converted into hydrogen. The activation energy can be reduced by the catalyst bed of the hydrogen reactor 116. Accordingly, and depending on the catalyst bed of the hydrogen reactor 116, the reactor temperature may vary depending on a material of the catalyst bed and the change in the activation energy caused by the catalyst bed. The reactor temperature (e.g., thermal energy available within the hydrogen reactor 116) and the fluid temperature of the feed solution (e.g., mixture of methanol and hydrogen) may overcome the activation energy for the conversion reaction and cause the methanol to be converted into hydrogen. Further, the hydrogen reactor enables the conversion reaction via the catalyst bed and/or the reactor temperature, thereby causing the methanol to be converted into hydrogen by providing sufficient energy to drive the conversion reaction.

In some examples, the hydrogen reactor 116 may enable the backup power system 126 to be provided with the amount of hydrogen sufficient to generate power that meets and/or exceeds a power deficit of the facility systems 130. In particular, the reactor controller 118 may be configured to request indications of a power supply capacity from the primary power system 132 and indications of power demand (e.g., power consumed) from the facility systems 130. Additionally, the reactor controller 118 may receive the indications of power supply (e.g., power supply capacity) and the indications of power demand and utilize the indications to determine whether the primary power system 132 is providing insufficient power to the facility systems 130 (e.g., the facility systems 130 are not receiving sufficient power to maintain operations and/or full operational capacity). The indications can be received from manual input (e.g., indications of the power demand of the facility systems 130 and/or primary power system 132 manually entered by an administrator), electrical sensors associated with the primary power system 132 and/or the facility systems 130, equations that determine the power demand based of the operational state of the facility systems (e.g., for a cloud computing facility, determining the computing load and the power consumed to execute the computations of the computing load), and/or other methods of identifying the power demand and the power supply. Accordingly, the reactor controller 118 may determine the power deficit of the facility systems 130 based on any of a number of inputs received from a variety of different sources.

In some additional examples, the reactor controller 118 may determine the amount of hydrogen consumed by the backup power system 126 to generate an amount of power sufficient to satisfy the power deficit, and cause the amount of methanol to be directed to the hydrogen reactor 116. In particular, and after receiving the indications of power supply and power demand, the reactor controller 118 may determine a power deficit from the power demand exceeding the power supply. Additionally, the reactor controller 118 may determine the amount of hydrogen that, when provided to the backup power system 126, causes the backup power system to generate the amount of power to meet and/or exceed the power deficit.

Figure 2:
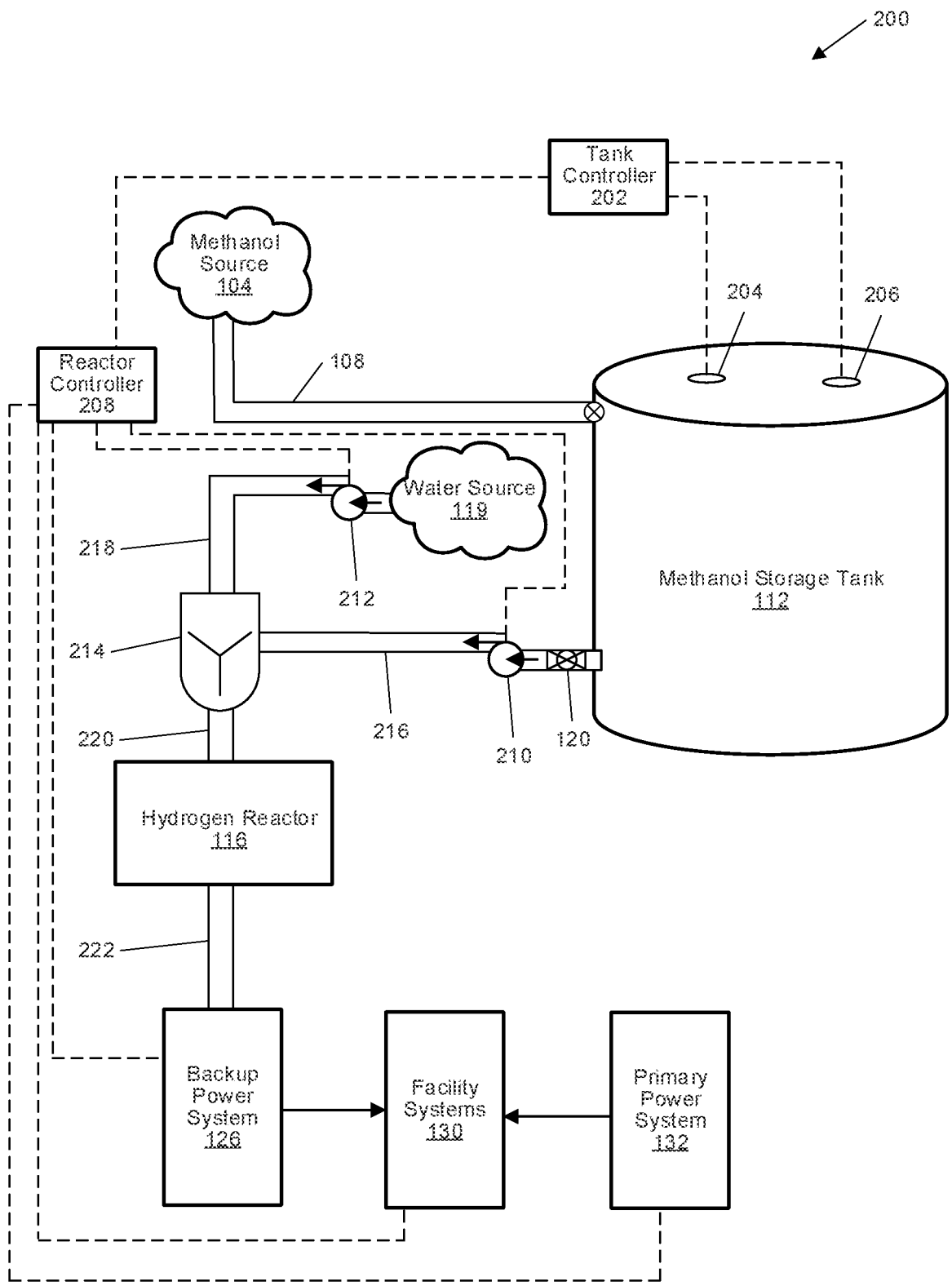
FIG. 2 is a schematic illustration of a methanol to hydrogen conversion system that combines methanol and water into a feed solution for conversion to hydrogen according to further examples of the present disclosure.

FIG. 2 is a schematic illustration of a methanol to hydrogen conversion system 200 according to further examples of the present disclosure. The methanol to hydrogen conversion system 200 can include many features and/or components discussed above with reference to FIG. 1, and where applicable, like item numerals have been used to identify like parts or components. As shown in FIG. 2, the methanol to hydrogen conversion system 200 can include a tank controller 202 configured to maintain the methanol stored within the methanol storage tank 112 and cause the methanol to be converted into hydrogen that is provided to the backup power system 126. The tank controller 202 may receive indications of temperature and pressure from sensors including a tank temperature sensor 204, a tank pressure sensor 206, and one or more additional sensors associated with the methanol to hydrogen conversion system 200. Additionally, the methanol can be directed via fluid handling components that are controlled by a reactor controller 208. In examples of the present disclosure, the reactor controller 208 may be substantially similar to and/or the same as the reactor controller 118 described above with respect to FIG. 1. In such examples, the reactor controller 208 may be operably connected to the fluid handling components noted above. Such fluid handling components may include one or more storage tank ports, a methanol line valve 120 fluidly connected to a methanol output line 216, a methanol pump 210 fluidly connected to the methanol output line 216, a water pump 212, and other fluid handling components that are utilized to direct the methanol and the water within the methanol to hydrogen conversion system 200. Further, the methanol to hydrogen conversion system 200 can include a reagent mixer 214 that is fed by the methanol output line 216, and a water output line 218 fluidly connected to the water source 119. Accordingly, the tank controller 202 can be configured to receive indications of state variables (e.g., temperature, pressure, fill level, etc.) associated with the methanol within the methanol storage tank 112, and the reactor controller 208 can be configured to manage production of the hydrogen from the methanol and the water.

In some examples, the methanol to hydrogen conversion system 200 may be abstracted to a fuel generation system that is configured to receive a first fuel reagent (e.g., methanol) and a second fuel reagent (e.g., water) and convert the first fuel reagent and the second fuel reagent into a fuel for the backup power system 126. In particular, the discussion of the methanol to hydrogen conversion system 200 may be abstracted to apply to other fuel systems that utilize the first fuel reagent to store an effective amount of fuel that is greater than a tank volume of the first fuel storage tank (e.g., the methanol storage tank 112). While specific operating variables may change where different reagents are utilized to generate the fuel for the backup power system, processes and operations similar to those noted with respect to at least FIG. 1 may be utilized to identify the amount of the first fuel reagent and the amount of the second fuel reagent that are to be provided to the hydrogen reactor 116 of the methanol to hydrogen conversion system 200.

In some examples, the tank controller 202 is configured to request indications of state variables within (e.g., associated with the methanol stored in the methanol storage tank 112) the methanol storage tank 112 via the tank temperature sensor 204, the tank pressure sensor 206, and other sensors (e.g., a fill level sensor that detects a volume of methanol stored by the methanol storage tank 112. Additionally, the tank controller 202 can be configured to communicate a storage tank state to the reactor controller 208. The tank temperature sensor 204 can be configured as a thermocouple, a thermometer, and/or a temperature. Similarly, the tank pressure sensor 206 can be configured to determine at least one of absolute pressure, gauge pressure, and/or differential pressure. Further, where the methanol storage tank 112 is equipped with a tank level sensor, the tank level sensor can be configured to determine a percentage of the methanol storage tank 112 that is filled with methanol, a weight amount of methanol within the methanol storage tank 112, and/or a total volume of methanol within the methanol storage tank 112. It is also understood that in some examples, one or more of the tank temperature sensor 204, the tank pressure sensor 206, or the tank level sensor may be omitted.

In some examples, the tank controller 202 can be configured to determine the methanol temperature, the methanol pressure, the methanol fill level, and other state variables for the methanol stored by the methanol storage tank 112. In particular, the tank controller 202 can determine the state variables for the methanol storage tank 112 on a substantially continuous, periodic, aperiodic, scheduled, and/or other basis. More specifically, the tank controller 202 can transmit a signal to a sensor (e.g., the tank temperature sensor 204, the tank pressure sensor 206, the tank level sensor, etc.) that causes the sensor to measure the associated state variable. In response to the signal, the sensor that receives the signal can determine the state variable and transmit an indication of the state variable to the tank controller 202. The tank controller 202 can record and/or track the state variables received from the sensors. These can be utilized to regulate the methanol storage tank 112 (e.g., increasing and/or decreasing the temperature and/or pressure of the stored methanol), identify when the volume of methanol stored by the methanol storage tank 112 is less than a volume threshold, and/or determine thermal energy that is to be provided to the amount of methanol that the hydrogen reactor 116 to bring the amount of methanol to the reactor temperature.

In some examples, the tank controller 202 can provide similar functionality for the water source 119. In particular, the tank controller 202 can receive indications associated with a water temperature, a water pressure, a water tank fill level, and/or other water state variables from sensors of the water source 119 and/or an intake mechanism associated with the water source 119. Similar to the process noted above with respect to the methanol storage tank 112, one or more sensors (not shown) associated with the water source 119 and/or with other downstream components of the methanol to hydrogen conversion system 200 can transmit indications of the state variables to the tank controller 202. The state variables may be utilized by the tank controller 202 to determine operating states for downstream components (e.g., an amount of work applied by pumps, energy output of heaters, throughput flowrates and velocity of mixers, valves, etc.) and/or maintaining the amount of water that is available via the water source 119. It should be noted that the water source 119 may be a virtually limitless water source (e.g., a water main is functionally limitless up to its maximum flow rate barring situations such as severe drought, water main breaks, and other serious issues, an ocean is functionally limitless and is limited by the capability of water purification systems, etc.) that includes state variables for output pressure, output flowrate, and other related variables that are utilized to control valves and/or pumps for controlling the amount of water received from the water source 119. Accordingly, the tank controller 202 receive and utilize state variables associated with both the methanol storage tank 112 and the water source 119, wherein the water source may be a water storage tank, a water main, and/or a body of water that is accessed via one or more pumps.

In some examples, the reactor controller 208 can be in communication with the tank controller 202 and receive one or more indications of state variables associated with the methanol storage tank 112 and/or the water source 119. Additionally, the reactor controller 208 can be in communication with one or more fluid handling systems. The fluid handling systems can include the methanol line valve 120, the methanol pump 210, the water pump 212, the reagent mixer 214, and/or other systems that are utilized to control and direct fluids within the methanol to hydrogen conversion system 200. Further, the reactor controller 208 can be in communication with and/or operably connected to a backup power system 126 to determine the power output by the backup power system 126, and to determine whether the power outputted by the backup power system 126 meets and/or exceeds the power deficit of one or more facility systems 130. As previously noted, the reactor controller 208 can be in communication with the facility systems 130 and/or a primary power system 132 to determine whether a power demand of the facility systems 130 is satisfied. In response to determining that the power demand is not satisfied by the primary power system 132, the reactor controller 208 can cause the backup power system 126 to receive the amount of hydrogen to satisfy the power deficit of the facility systems 130 and receive indications of power generation (e.g., the amount of power generated from the amount of hydrogen) from the backup power system 126. The indications of power generation may be utilized to determine whether addition hydrogen is to be provided and additional power is to be generated to maintain operation of the facility systems 130.

In some examples, the reactor controller 208 can be configured to direct the amount of methanol from the methanol storage tank 112 to the reagent mixer 214, and thus, to the hydrogen reactor 116. In particular, the reactor controller 208 can operate the methanol line valve 120 and/or the methanol pump 210 to extract the amount of methanol from the methanol storage tank 112. Additionally, the amount of methanol can be determined based at least on the power deficit of the facility systems 130, wherein the amount of methanol is determined to generate the amount of hydrogen that, when consumed by the backup power system 126, outputs power sufficient to meet or exceed the power deficit. The reactor controller 208 operates the methanol pump 210 (e.g., where the methanol pump 210 is a rotary pump, causing a motor connected to the methanol pump 210 to drive the methanol from a pump input to a pump output at a flow rate determined by the internal motor) to obtain methanol from the methanol storage tank 112, and provide the methanol to the reagent mixer 214 and/or the hydrogen reactor 116. Further, the reactor controller 208 can cause the methanol to be obtained and provided at a flow rate such that the amount of methanol is provided to the hydrogen reactor 116.

In some examples, the reactor controller 208 can be configured to direct the amount of water from the water source 119 to the reagent mixer 214 and the hydrogen reactor 116. In particular, the reactor controller 208 can operate a water line valve and/or the water pump 212 to extract at least the amount of water from the water source 119. Additionally, the amount of water can be determined based at least on the power deficit of the facility systems 130. For example, the reactor controller 208 may determine the amount of water required to react with the amount of methanol provided by the methanol pump 210, such that when the reaction is complete, the resulting amount of hydrogen that is generated, when consumed by the backup power system 126, will produce an amount of power sufficient to meet or exceed the power deficit. In such examples, and in a manner similar to the operation of the methanol pump 210 described above, the reactor controller 208 operates the water pump 212 to obtain water from the water source 119, and provide the water to the reagent mixer 214, and thus, the hydrogen reactor 116. Further, the reactor controller 208 can cause the methanol and the water to be obtained and provided at a first flow rate and a second flow rate, respectively, such that desired amounts of methanol and water are provided to the hydrogen reactor 116.

In some examples, the reactor controller 208 can operate the reagent mixer 214 to combine the amount of water and the amount of methanol into a reagent mixture that is provided to the hydrogen reactor 116. It should be noted that the amount of water and the amount of methanol may be provided to the hydrogen reactor 116 separately. In particular, the methanol pump 210 can provide a desired or first amount of methanol to the reagent mixer 214 via a methanol output line 216. Similarly, the water pump 212 can provided a desired or second amount of water to the reagent mixer 214 via the water output line 218. Additionally, after the reagent mixer 214 combines the first amount of methanol and the second amount of water, the reagent mixture can be provided to the hydrogen reactor 116 via a reactor input line 220. The reagent mixer 214 can be configured to receive at least two fluids and combine the two fluids into a substantially homogenous single fluid. Further, the reagent mixer 214 can be an active mixer that utilizes a motor (not shown) that is, for example, operably connected to the reactor controller 208 and/or a separate mixer controller (not shown) to rotate internal components of the reagent mixer 214 that combine the two fluids. Alternatively, or in addition, the reagent mixer 214 can be a passive mixer that includes internal structures that cause the two fluids to combine.

In some examples, the reagent mixer 214 can combine the amount of water and the amount of methanol to form a reagent mixture. The reagent mixture is an aqueous solution that when passed through a catalyst bed of the hydrogen reactor 116 is converted into the amount of hydrogen. Additionally, the reagent mixer 214 can output the reagent mixture to the hydrogen reactor 116 via the reactor input line 220.

In some examples, the hydrogen reactor 116 can receive the reagent mixture and covert the methanol and the water in the reagent mixture into the amount of hydrogen. In particular, the hydrogen reactor 116 can be a continuous reactor, wherein the amount of hydrogen is provided to the backup power system 126 via a reactor output line 222 that is fluidly connected to both the hydrogen reactor 116 and the backup power system 126. Although not illustrated in FIG. 2, it is understood that one or more valves, pumps, and/or other flow control components may be fluidly connected to the reactor output line 222 to controllably regulate the flow of hydrogen from the hydrogen reactor 116 to the backup power system 126. Further, the amount of hydrogen described herein may be referred to and/or may otherwise comprise a regulated flow rate (e.g., a volume per unit time) of hydrogen that is continuously or substantially continuously directed to the backup power system 126. Alternatively, or in addition, the hydrogen reactor 116 can be a batch reactor, wherein the amount of hydrogen is a volume of a buffer tank that stores the amount of hydrogen and provides the amount of hydrogen to the backup power system over a period of time. The hydrogen reactor 116 can generate sufficient hydrogen that the backup power system 126 is able to meet or exceed the power deficit of the facility systems 130.

Figure 3:
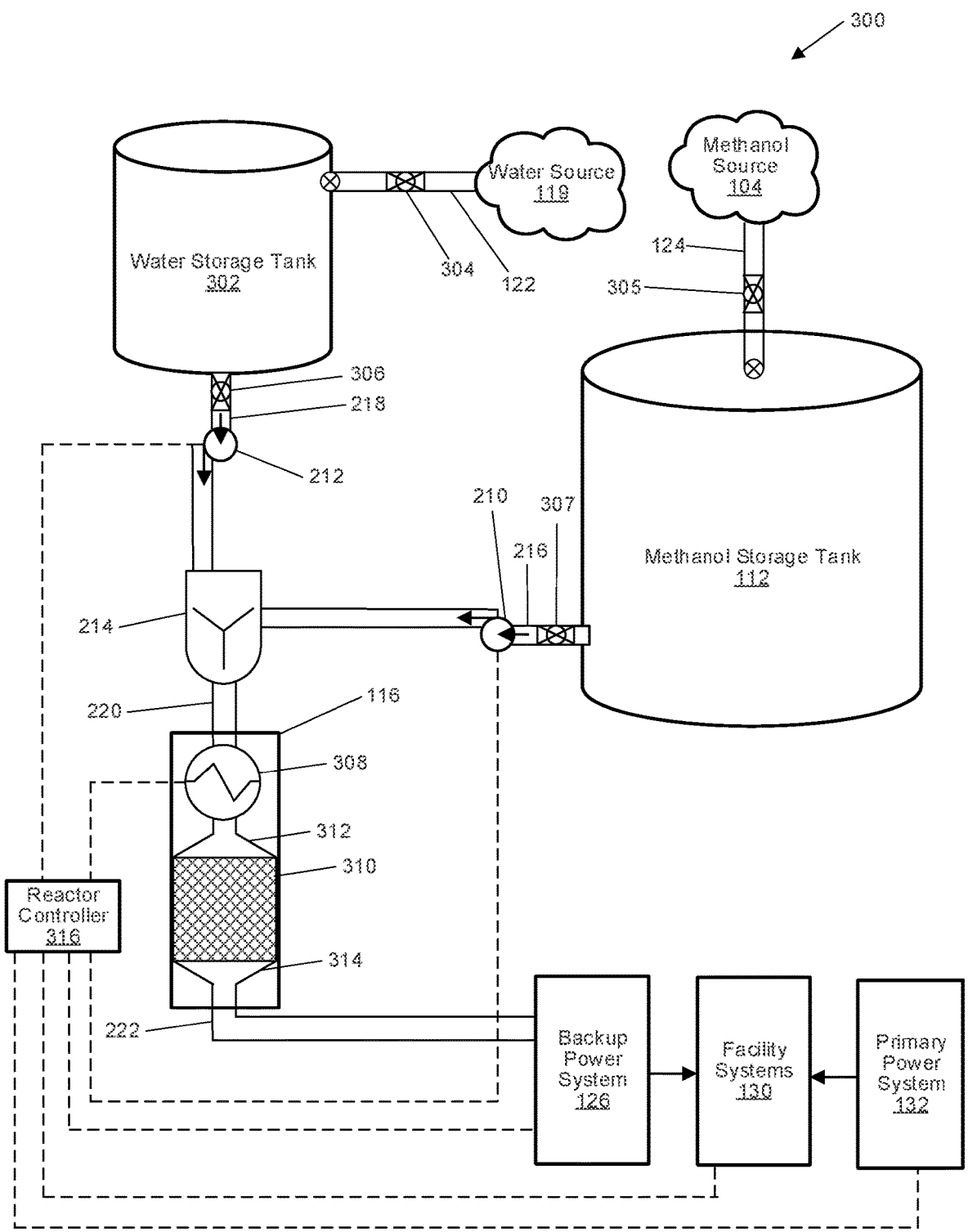
FIG. 3 is a schematic illustration of a methanol to hydrogen conversion system that is configured as a closed system according to further examples of the present disclosure.

FIG. 3 is a schematic illustration of a methanol to hydrogen conversion system 300 according to further examples of the present disclosure. The methanol to hydrogen conversion system 300 shown in FIG. 3 can include many features and/or components that are similar to and/or the same as those discussed above with reference to the methanol to hydrogen conversion system 100 of FIG. 1 and/or the methanol to hydrogen conversion system 200 of FIG. 2. Where applicable in FIG. 3, and in the description below, like item numerals have been used to identify like parts or components.

As shown in FIG. 3, the methanol to hydrogen conversion system 300 can include the methanol storage tank 112 and/or the backup power system 126 described above. In some examples, the methanol to hydrogen conversion system 300 may also include a water storage tank 302 configured to store water. In such examples, water stored in the water storage tank 302 as well as methanol stored in the methanol storage tank 112 shown in FIG. 3 can be used as reagents for generating an amount of hydrogen for the backup power system 126. In such examples, the water storage tank 302 is fluidly connected to a water source 119 via a water line 122, and a water line valve 304 fluidly connected to the water line 122. Likewise, the methanol storage tank 112 is fluidly connected to a methanol source 104 via a methanol line 124, and a methanol line valve 305 fluidly connected to the methanol line 124. Additionally, the methanol and the water can be directed via fluid handling components (e.g., a water line valve 306 fluidly connected to a water output line 218, a methanol line valve 307 fluidly connected to a methanol output line 216, a methanol pump 210, a water pump 212, etc.) to the reagent mixer 214, and thus, to a reactor heater 308 and a catalyst bed 310 of a hydrogen reactor 116. A reagent mixture formed by the reagent mixer 214 may be directed to the hydrogen reactor 116 from the reagent mixer 214 via a reactor input line 220 fluidly connected to the hydrogen reactor 116. Reagent mixture received by the hydrogen reactor 116 may be provided to the catalyst bed 310 via the reactor heater 308 and a catalyst bed input 312. Similarly, the amount of hydrogen may be output via a catalyst bed output 314. Further, the methanol to hydrogen conversion system 300 may be controlled and/or operated by a reactor controller 316. In some examples, the reactor controller 316 may be substantially similar to the reactor controller 208, and may operate similar to the reactor controller 208. Accordingly, the reactor controller 316 can be configured to cause the hydrogen reactor 116 to generate a desired amount of hydrogen from the methanol and the water contained in the received reagent mixture.

In some examples, the water storage tank 302 can be utilized as the water source 119 for the methanol to hydrogen conversion system 200. In particular, the water storage tank 302 can be utilized where the methanol to hydrogen conversion system 300 does not have access to an external water source such as a body of water or a municipal water main. The water storage tank 302 enables the methanol to hydrogen conversion system 300 to operate as a closed system (e.g., the methanol to hydrogen conversion system is substantially isolated from external inputs during operation). For example, a locomotive engine may be isolated from external sources of methanol and water during travel such that the water storage tank 302 and the methanol storage tank 112 are configured to store the water and the methanol sufficient to operate the backup power system 126 for a period of time. Additionally, the water storage tank 302 is configured to store a volume of water sufficient to convert the volume of methanol into hydrogen. Alternatively, a the backup power system 126 for one or more facility systems 130 can be configured to operate independent of outside water sources to ensure operation of the backup power system 126. Further, it is understood that, during refill operations, the water line valve 304 and the water line 122 may fluidly connect the water storage tank 302 with the water source 119. Similarly, during refill operation, the methanol line valve 305 and the methanol line 124 may fluidly connect the methanol storage tank 112 with the methanol source 104. In some examples, one or both of the water line valve 304 or the methanol line valve 305 may comprise quick disconnect couplings or other types of removably attachable fluid couplings configured to fluidly connect and permit the water source 119 and the methanol source 104 to provide the volume of water and the volume of methanol to the water storage tank 302 and the methanol storage tank 112, respectively. Accordingly, the water storage tank 302 can be configured to store sufficient water to convert the volume of methanol within the methanol storage tank 112 to hydrogen.

In some examples, the reactor controller 316 may be operably connected to the water line valve 306 and/or the water pump 212, and may be configured to control the amount of water provided from the water storage tank 302 to the reagent mixer 214. Similarly, the reactor controller 316 may be operably connected to the methanol line valve 307 and/or the methanol pump 210, and may be configured to control the amount of methanol provided to from the methanol storage tank 112 to the reagent mixer 214. Additionally, the water line valve 306 and the water pump 212 can be utilized to modify a flowrate of water and/or a water pressure. Accordingly, the reactor controller 316 can operate the water pump 212 to provide the amount of water to the reagent mixer 214 from the water storage tank 302.

In some examples, the reactor controller 316 can be configured to determine desired amounts of water and methanol to be provided to the reagent mixer 214. In particular, the reactor controller 316 can be configured to determine an amount of methanol to be provided to the hydrogen reactor 116, as well as an amount of thermal energy that is to be provided to a corresponding amount of methanol. In such examples, the determined amount of thermal energy may elevate a temperature of the amount of methanol to a desired reaction temperature associated with the catalyst bed 310 of the hydrogen reactor 116. More specifically, the reactor controller 316 can cause the reactor heater 308 to provide thermal energy to the reagent mixture received from the reagent mixer 214. The reactor heater 308 can be configured to heat the reagent mixture (and thus, the methanol included in the reagent mixture) such that when the reagent mixture passes through the catalyst bed 310, the methanol included in the reagent mixture is converted into a desired amount of hydrogen, and such that the conversion occurs within a peak reaction efficiency range of the catalyst bed 310. The reaction temperature is determined based at least on the catalyst bed 310 and is the temperature at which the amount of methanol is substantially completely converted into the amount of hydrogen (some of the amount of methanol may be consumed by side reactions that incompletely and/or do not yield hydrogen). In some examples, a desired temperature for the conversion of methanol to hydrogen within the hydrogen reactor 116 (e.g., across the catalyst bed 310) may be between approximately 200° C. and approximately 250° C. Accordingly, the reactor controller 316 can be configured to determine the amount of water and the amount of methanol, the flow rate of water and the flow rate of methanol, and the thermal energy to raise the amount of water and the amount of methanol to the desired reaction temperature.

In some examples, the hydrogen reactor 116 can include the reactor heater 308 and the catalyst bed 310. Additionally, the reagent mixture can be provided from the reactor heater 308 to the catalyst bed 310 via a catalyst bed input 312 and the amount of hydrogen can be received from the catalyst bed 310 via the catalyst bed output 314. In particular, the reactor heater 308 can be a component of the hydrogen reactor 116 that receives the reagent mixture from the reagent mixer 214 via the reactor input line 220. The reactor heater 308 can be configured as a heat exchanger, a heating element within the reactor input line 220, and/or other heating system that provides thermal energy to the reagent mixture. Additionally, the catalyst bed input 312 can be a portion of the reactor input line 220 that fluidly connects the reactor heater 308 with the catalyst bed 310 such that the reagent mixture is distributed to the catalyst bed 310 and full wets the catalyst bed 310. Similarly, the catalyst bed output can be a portion of the reactor output line 222 that collects the amount of hydrogen and byproducts of the conversion reaction from the catalyst bed 310 and provides the amount of hydrogen to the backup power system 126.

In some examples, the catalyst bed 310 is configured to drive the amount of methanol to substantially complete conversion. In particular, the catalyst bed 310 is configured to have a catalyst bed length and a catalyst bed surface area that enables the substantially complete conversion of the methanol to hydrogen. More specifically, the catalyst bed 310 is configured such that, at the maximum flow rate of hydrogen that the backup power system 126 can receive, the flow rate of the methanol is converted into the maximum flow rate of hydrogen. The catalyst bed 310 has active sites that are capable of catalyzing the conversion reaction of methanol to hydrogen, wherein the number of active sites within the catalyst bed 310 is correlated to the surface area of the catalyst within the catalyst bed 310 and the size of the catalyst bed 310. Accordingly, the reactor controller 316 can store conversion reaction information that describes the amount of hydrogen produced from the amount of methanol. Additionally, the conversion reaction information can describe the completeness of the conversion reaction (e.g., at low flow rates 99.999% of the methanol is converted, but at flow rates approaching the maximum flow rate 94% of the methanol is converted). Further, the reactor controller 316 can utilized the conversion reaction information when determining the amount of methanol and the amount of water that is provided to the reagent mixer 214.

In some examples, the methanol to hydrogen conversion system 300 can also include purification and/or reclamation systems (not shown). In particular, an example purification system can be utilized to remove impurities from the reagent mixture and/or from the amount of hydrogen produced by the hydrogen reactor 116. Additionally, an example reclamation system can be utilized to remove methanol from the amount of hydrogen produced by the hydrogen reactor 116, and to recycle the removed methanol back into the methanol to hydrogen conversion system 200. The reclamation system can enable the hydrogen reactor 116 to operate at less than complete conversion of the amount of methanol by extracting unconverted methanol from the amount of hydrogen and providing the unconverted methanol to the methanol storage tank 112 and/or the reagent mixer 214. It should be noted that the purification system and/or the reclamation system can be configured as distillation systems, filtration systems, and/or other systems configured to separate species of a solution (e.g., removing impurities from the water, removing methanol from the hydrogen, etc.).

Figure 4:
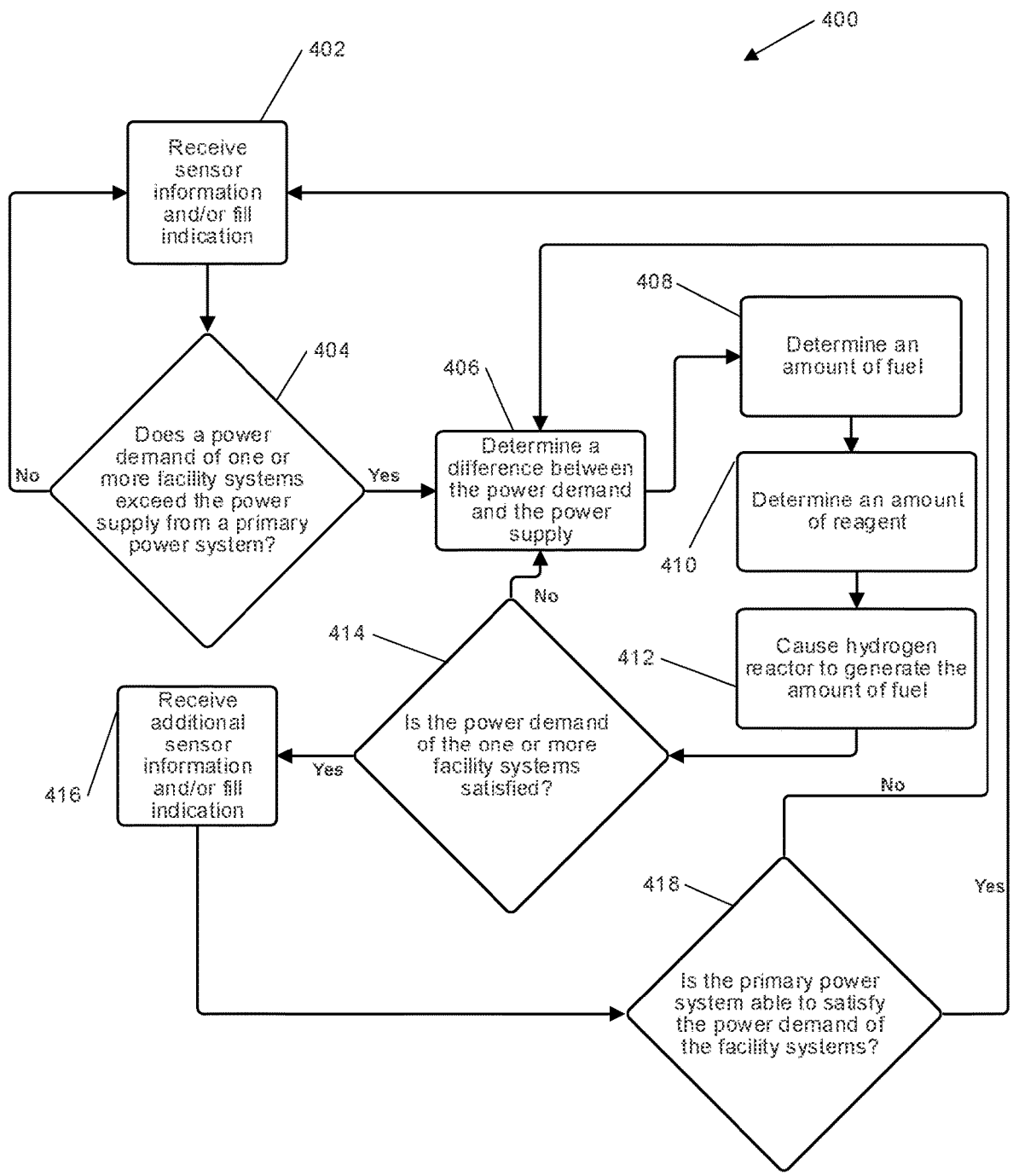
FIG. 4 is a block diagram illustrating a method according to examples of the present disclosure for determining that the backup power system is to be utilized to power facility systems.

FIG. 4 is a block diagram of a method 400 according to examples of the present disclosure. The method 400 can be executed by a processor of any of the reactor controllers 118, 208, 316 described above with respect to FIGS. 1-3. Further, the steps of the methods (e.g., method 400) described herein can be performed in any order by one or more servers, processors, controllers, and/or other devices, acting alone and/or in combination. Additionally, in some examples, one or more steps of the method 400 may be combined or omitted. For ease of discussion, and unless stated otherwise, the steps of the method 400 will be described as being performed by the reactor controller 118 shown in FIG. 1. It is understood that similar steps and/or the same steps can be performed by the reactor controller 208, the reactor controller 316, and/or other controllers of the methanol to hydrogen conversion systems 100, 200, 300 described herein.

At 402, the reactor controller 118 can be configured to receive information from one or more sensors 114 associated with the methanol to hydrogen conversion system 100. For example, at 402, the reactor controller 118 may receive temperature information, pressure information, flow rate information, and/or other information indicative of methanol levels, water levels, and/or other characteristics of methanol and/or water associated with the methanol to hydrogen conversion system 100. In particular, at 402 the reactor controller 118 can receive methanol storage tank pressure information, methanol storage tank level information and/or other information indicative of an amount, pressure, and/or temperature of methanol stored within the methanol storage tank 112. At 402, the reactor controller 118 may also receive one or more fill indications (e.g., fill requests) associated with the methanol storage tank 112. Such fill indications may be received by the reactor controller 118 from the facility systems 130 supported by the backup power system 126. Additionally, at 402 the reactor controller 118 can receive corresponding indications, fill requests, power deficit information, and/or other information from the primary power system 132.

At 404 the reactor controller 118 can determine whether the power demand of the one or more facility systems 130 exceeds the power supply from a primary power system 132. In particular, the reactor controller 118 can be in communication with the facility systems 130 and the primary power system 132. The reactor controller 118 may receive indications of power demand from the facility systems 130 and power supply from the primary power system 132. The indications of power demand can indicate a first amount of power that the facility systems 130 are consuming during operation. Similarly, the indications of power supply can indicate a second amount of power that the primary power system 132 is able to provide to the facility systems 130. Additionally, based on the indications of power demand and the indications of power supply, the reactor controller 118 can determine whether the facility systems 130 are operating at a power deficit (e.g., the power demand of the facility systems 130 exceeds the power supply of the primary power system 132). If, at 404, the reactor controller 118 determines that the power demand of one or more facility systems 130 does not exceed (e.g., is less than or equal to) the power supply from the primary power system 132 (Step: 404— No), the reactor controller 118 may proceed to Step: 402. However, if at 404 the reactor controller 118 determines that the power demand of one or more facility systems 130 does exceed (e.g., is greater than) the power supply from the primary power system 132 (Step: 404— Yes), the reactor controller 118 may proceed to Step: 406.

It should be noted that the reactor controller 118 can operate at Steps 402 and 404 on a substantially continuous, periodic, aperiodic, and/or scheduled basis. In particular, the reactor controller 118 can be configured to transmit requests to a temperature sensor (such as the temperature sensor 204 described above with respect to FIG. 2), a pressure sensor (such as the pressure sensor 206 described above with respect to FIG. 2), and/or one or more additional sensors (e.g., a fill sensor) associated with the methanol storage tank 122 or other storage tanks (e.g., a water storage tank) or components (e.g., the methanol source 104, the water source 104) of the methanol to hydrogen conversion system 100. Additionally, the reactor controller 118 can be configured to transmit requests to the facility systems 130 to receive indications of power demand and whether the facility systems 130 are receiving sufficient power to maintain operation. Accordingly, the reactor controller 118 can be configured to receive the indications regarding the fuel reagent temperature and the fuel reagent pressure to ensure that the fuel reagent is being properly maintained within the methanol storage tank 112. Further, the reactor controller 118 can receive the indications regarding the power demand and the operational status of the facility systems 130 such that the reactor controller 118 may identify when the facility systems 130 are operating at a power deficit. It should be noted that the requests for state variables of the fuel reagent (e.g., methanol stored within the methanol storage tank 112) may be transmitted on a different basis than the requests for power state of the facility systems 130.

At 406, and based at least in part on determining at 404 that the facility systems 130 are operating at a power deficit, the reactor controller 118 may determine an actual and/or current amount (e.g., a value) of the power deficit. For example, at 406, the reactor controller 118 may determine a difference between the power demand of the facility systems 130 and the power supply of the primary power system 132. In particular, at 406 the reactor controller 118 may transmit a request to the primary power system 132 and/or may otherwise cause the primary power system 132 to transmit an indication of the amount of power is currently being provided to the facility systems 130 by the primary power system 132. Additionally, at 406 the reactor controller 118 may transmit a corresponding request to the facility systems 130 and/or may otherwise cause the facility systems 130 to provide an indication of the power demand of the facility systems 130 to maintain operation. From the information received at 406, the reactor controller 118 may determine, at a first time and/or a plurality of times, a difference between the power demand and the power supply, and such a difference may represent an amount of power (e.g., a first amount of power) required to maintain operation of the facility systems 130 at their current run rate.

At 408, the reactor controller 118 can determine an amount of fuel needed to satisfy the difference (e.g., an amount of fuel needed to generate the first amount of power) determined at 406. In particular, at 408 the reactor controller 118 can access a memory that stores correlations between amounts of fuel generated and amounts of power required by various facility systems 130. At 408, the reactor controller 118 may also access one or more stored power generation models associated with the hydrogen reactor 116 and/or with the backup power system 126. Further, at 408 the reactor controller 118 can access one or more stored fuel thresholds that can be used to determine an amount of fuel that is to be provided to the backup power system 126. For example, the fuel thresholds can include a minimum amount of fuel for backup power system 126 operation, a maximum amount of fuel that the backup power system 126 can consume, and an efficiency threshold that indicates an amount of power that enables the backup power system 126 to operate at peak efficiency to further inform the amount of fuel that is to be provided to the backup power system 126. Accordingly, at 408 the reactor controller 118 can be configured to determine an amount of hydrogen that is to be provided to the backup power system 126 such that the power deficit of the facility systems 130 is met and/or exceeded by the power output of the backup power system 126.

At 410, the reactor controller 118 can determine an amount of reagent that is required to generate the amount of fuel determined at 408. In particular, at 410 the reactor controller 118 can access equations and models stored in a memory of the reactor controller 118 to determine the conversion efficiency and conversion completeness of a fuel reactor at a flow rate of the fuel reagent. More specifically, the reactor controller 118 can access functions and correlations that, depending on the amount of fuel that is to be provided to the backup power system 126 to generate sufficient power to meet or exceed the power deficit, can determine the amount of fuel reagent that enables the hydrogen reactor 116 to produce the amount of fuel for the backup power system 126. Due to the amount of fuel reagent not converting to the amount of fuel at a 1:1 ratio, the correlations and the functions utilized by the reactor controller 118 enable the reactor controller 118 to more accurately control the hydrogen reactor 116 and the fluid handling components (e.g., pumps, valves, etc.) while the hydrogen reactor 116 generates the amount of fuel for the backup power system 126. Accordingly, at 410 the reactor controller 118 can determine the amount of reagent that would cause the determined amount of fuel (e.g., the amount of fuel determined at 408) to be generated, in the presence of a corresponding amount of water, by the hydrogen reactor 116. Example equations that may be used by the reactor controller 118 to determine various amounts are noted below.

$$\text{Power} = \dot{m}_{H_2} \times LHV_{H_2} \times \eta_{PS}$$

$$\dot{m}_{H_2} \times LHV_{H_2} = \dot{m}_{MeOH} \times LHV_{MeOH} \times \eta_{reactor}$$

$$\dot{m}_{MeOH} = \frac{\text{Power}}{\eta_{PS} \times LHV_{MeOH} \times \eta_{reactor}}$$

$$\dot{m}_{H_2O} \times MW_{H_2O} = \dot{m}_{MeOH} \times MW_{MeOH} \times \chi$$

Where:
$\dot{m}_{MeOH}$=mass flowrate of methanol to the reactor
Power=power demand from the backup power system
$\dot{m}_{H_2}$=mass flowrate of hydrogen to the power system
$LHV_{MeOH}$=lower heating value of methanol
$LHV_{H_2}$=lower heating value of hydrogen
$\eta_{PS}$=efficiency of the power system (the efficiency of the power system will be a function of the power output, which can be provided to the controller as a lookup table with values established from calibration and testing)
$\eta_{reactor}$=efficiency of the reactor defined as $$\frac{\text{fuel energy out}}{\text{fuel energy in}}$$

(which may be dependent on the flowrates and ratio of water to methanol in the input stream)
$\dot{m}_{H_2O}$=mass flowrate of water to the reactor
$MW_{H_2O}$=molecular weight of water
$MW_{MeOH}$=molecular weight of methanol
$\chi$=molar ratio of water to methanol in the reactor feed stream In some examples, at 410 the reactor controller 118 can determine the amount of an additional reagent that is reacted with the fuel reagent to produce the amount of fuel. In particular, the correlations and functions utilized by the reactor controller 118 can further be utilized to identify the amount of additional reagent that is reacted with the amount of fuel reagent to produce the amount of fuel. The correlations and the functions can include conversion reactions, equilibrium equations for the reaction of fuel reagent and additional reagent to fuel, and side reactions that may occur within the hydrogen reactor 116. For example, the correlations and functions may include kinematic equations that are utilized to approximate an equilibrium state of the conversion reaction. Given one or more of the amount of fuel reagent, the amount of the additional reagent, reactor temperature, a flow rate of the feed solution through the hydrogen reactor 116, a targeted conversion completion (e.g., percent of the amount of fuel reagent converted), and other operational variables of the hydrogen reactor 116, the kinematic equations can be solved to determine individual variables (e.g., can solve for expected targeted conversion completion by providing the other variables of the kinematic equations). It should be noted that while the amount of fuel reagent is determined to generate the amount of fuel, the amount of additional reagent may be provided in excess to the hydrogen reactor 116. While the fuel reagent may be limited by the volume of the storage tank and may limit operational timeframes for the backup power system 126 (e.g., backup power system 126 can receive fuel so long as the storage tank contains the fuel reagent), the additional reagent may be sourced from a functionally limitless additional reagent source (e.g., a water main may be functionally limitless for the purpose of producing hydrogen from methanol). Accordingly, the reactor controller 118 may cause excess additional reagent to be directed to the hydrogen reactor 116 by operating fluid control devices (e.g., valves, pumps, etc.). The excess additional reagent may drive the conversion reaction of fuel reagent to fuel toward substantially complete conversion.

At 412, the reactor controller 118 may cause the hydrogen reactor 116 to generate the amount of fuel determined at 408. For example, at 412, the reactor controller 118 and/or other controllers of the methanol to hydrogen conversion system 100 may control the methanol line valve 120 to direct the amount of methanol determined at 410 to the hydrogen converter 116 via the methanol line 124. At 412, the reactor controller 118 may also cause the water line valve 121 to direct an amount of water required for complete and/or substantially complete conversion of the amount of methanol to hydrogen fuel, by the hydrogen reactor 116, to the hydrogen reactor 116 via the water line 122. In such examples, the reactor controller 118 may determine the amount of water required for such complete and/or substantially complete conversion of the amount of methanol at 410. At 412, the reactor controller 118 may also operate the various fluid control systems (e.g., pumps, valves, etc.) of the methanol to hydrogen conversion system 100 to direct the hydrogen generated by the hydrogen reactor 116 to the backup power system 126 for consumption. It is understood that the amount of fuel generated at 412 and provided to the backup power system 126 can be consumed by the backup power system 126, at 412, to generate an amount of power that is provided to the facility systems 130. Such power generated by the backup power system 126 may be provided to the facility systems 130 to supplement the power supplied to the facility systems 130 by the primary power system 132, and/or in place of the power supplied to the facility systems 130 by the primary power system 132.

At 414, the reactor controller 118 can determine whether the power demand of the one or more facility systems 130 is satisfied by the backup power system 126 consuming the amount of fuel generated at 412. For example, at 414 and similar to the process described above with respect to step 404, the reactor controller 118 can receive indications of the power demand and the power deficit associated with the facility systems 130 during operation of the backup power system 126. At 414, the reactor controller 118 can determine, based on the received information, whether the amount of power provided by the backup power system 126 at 412, alone or in combination with the power provided by the primary power system 132, is greater than or equal to the current power demand of the facility systems 130. Where the amount of power generated by the backup power system 126 at 412, alone or in combination with the power provided by the primary power system 132, meets or exceeds (e.g., is greater than or equal to) the power demand of the facility system 130 (Step: 414—Yes), the reactor controller 118 proceeds to step 416. Alternatively, if the reactor controller 118 determines, at 414, that the amount of power generated by the backup power system 126 at 412, alone or in combination with the power provided by the primary power system 132, is less than the power demand of the facility system 130 (Step: 414—No), the reactor controller 118 may return to step 406.

At 416, the reactor controller 118 can receive additional indications associated with the power demand and the operational state of the one or more facility systems 130. In particular, the additional indications can be received from the facility systems 130 to indicate the power demand of the facility systems 130 and the operational state of the facility systems 130. The information received at 416 may, in some examples, be similar to the information and/or other indications described above with respect to at least step 402.

At 418, the reactor controller 118 can determine, based at least on the additional information received at 416, whether the primary power system 132 is currently capable of satisfying the power demand of the facility systems 130. For example, the reactor controller 118 may make such a determination using the information received at 418, and based at least in part on the additional power having been supplied to the facility systems 130 by the backup power system 126 at 412. For example, at 418, the reactor controller 118 may determine, based on the information received at 416, if the current power being supplied by the primary power system 132 is greater than or equal to the current power demand of the facility systems 130. If, at 418, the reactor controller determines that the primary power system 132 is capable of satisfying the power demand of the facility systems 130 without continued power being supplied by the backup power system 126 (e.g., that the current power being supplied by the primary power system 132 is greater than or equal to the current power demand of the facility systems 130) (Step: 418—Yes), the reactor controller 118 may return to step 402 and may discontinue operation of the backup power system 126. Alternatively, if, at 418, the reactor controller determines that the primary power system 132 is incapable of satisfying the power demand of the facility systems 130 without continued power being supplied by the backup power system 126 (e.g., that the current power being supplied by the primary power system 132 is less than the current power demand of the facility systems 130) (Step: 418—No), the reactor controller 118 may return to step 406.

Figure 5:
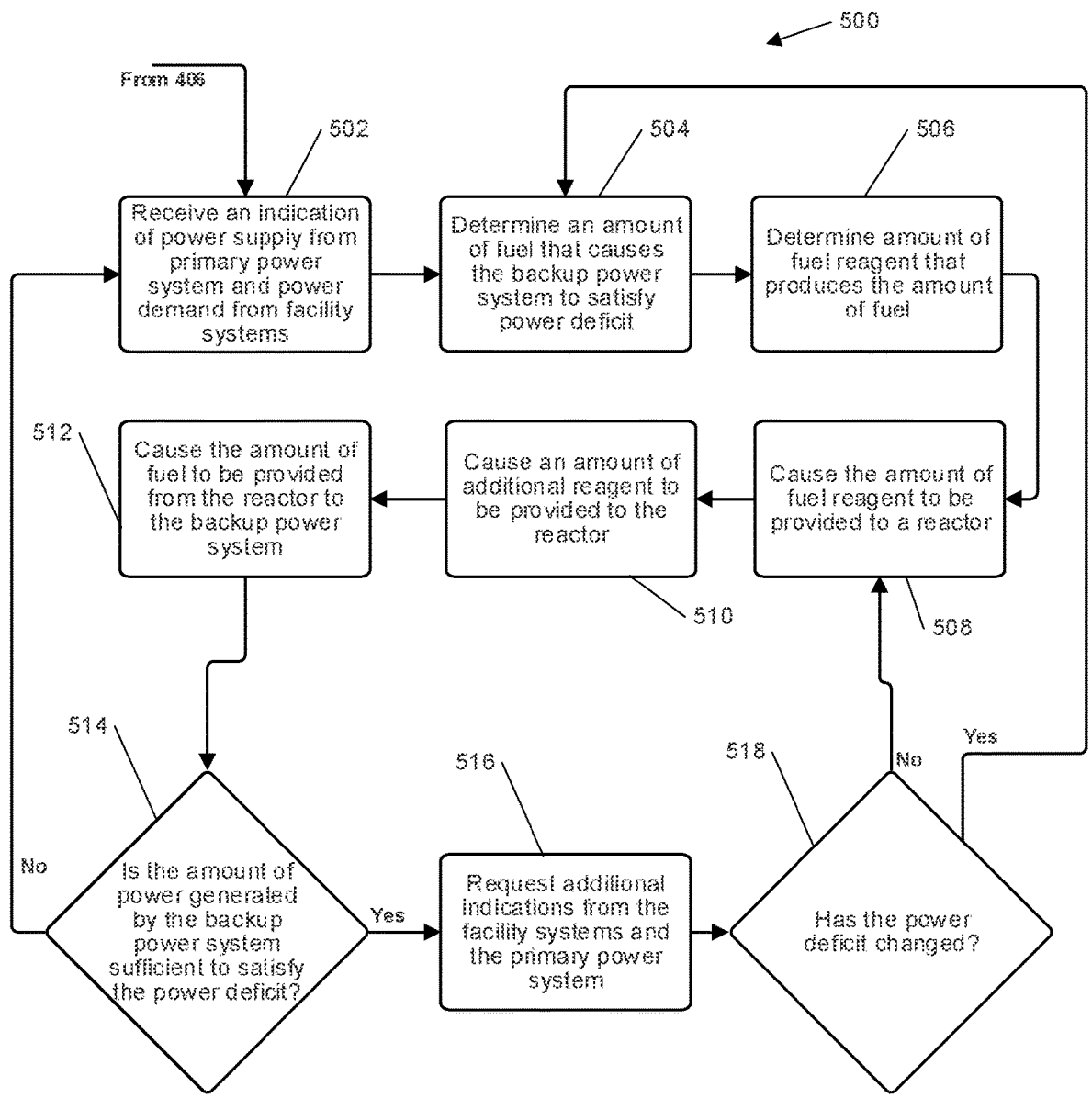
FIG. 5 is a block diagram illustrating a method according to examples of the present disclosure for determining the amount of fuel to satisfy a power deficit and generate the amount of fuel.

FIG. 5 is a block diagram illustrating an example method 500 for determining an amount of fuel to satisfy a power deficit, and for generating the determined amount of fuel. As with the method 400 described above, the method 500 can be executed by a processor of any of the reactor controllers 118, 208, 316 described above with respect to FIGS. 1-3. Further, the steps of the method 500 can be performed in any order by one or more servers, processors, controllers, and/or other devices, acting alone and/or in combination. Additionally, in some examples, one or more steps of the method 500 may be combined or omitted. For ease of discussion, and unless stated otherwise, the steps of the method 500 will be described as being performed by the reactor controller 118 shown in FIG. 1. It is understood that similar steps and/or the same steps can be performed by the reactor controller 208, the reactor controller 316, and/or other controllers of the methanol to hydrogen conversion systems 100, 200, 300 described herein.

As described above with respect to at least step 406 of FIG. 4, the reactor controller 118 can determine a difference between the power demand of the facility systems 130 and the power supplied to the facility systems 130 by the primary power system 132. Additionally, the reactor controller 118 can utilize the determined difference to generate sufficient fuel (e.g., hydrogen) to power the facility systems 130. Accordingly, the reactor controller 118 can operate to maintain operation of the facility systems 130 by continuously updating the amount of fuel being provided to the backup power system 126 based on the power deficit and fluctuations in the power deficit.

With reference to FIG. 5, and after performing at least the processes described above with respect to step 406 of method 400, at 502, the reactor controller 118 can receive an indication of power supply from the primary power system 132 and an indication of power demand from the facility systems 130. The indication of the power supply and of the power demand can be received from sensors and/or systems associated with the primary power system 132 and the facility systems 130. Alternatively, or in addition, the indication of the power supply and of the power demand received at step 502 can be provided by an administrator and/or calculated from the operational state of the primary power system 132 and/or the facility systems 130. The indication of the power supply and the power demand can be the power difference determined at Step 406.

At 504, the reactor controller 118 can determine an amount of fuel that causes the backup power system 126 to satisfy the power deficit. In particular, the reactor controller 118 can access operation models for the backup power system 126 and determine the amount of fuel that, when provided to and consumed by the backup power system 126, generates the amount of power that meets or exceeds (e.g., is greater than or equal to) the power deficit.

At 506, the reactor controller can determine an amount of fuel reagent (e.g., methanol) that produces the amount of fuel. Similar to step 504, the reactor controller 118 can access additional operation models for the hydrogen reactor 116 (or fuel reactor) that compensate for side reactions that produce byproducts and conversion completeness of the fuel reagent to the fuel at different flow rates. Accordingly, at 506 the reactor controller 118 can determine the amount of fuel reagent that permits the amount of fuel to be produced by the hydrogen reactor 116.

At 508, the reactor controller 118 can cause the amount of fuel reagent to be provided to the hydrogen reactor 116. In particular, the reactor controller 118 can operate fluid control systems such as valves and pumps to direct the amount of fuel reagent from the methanol storage tank 112 to the hydrogen reactor 116. Additionally, the reactor controller 118 can operate additional systems between the methanol storage tank 112 and the hydrogen reactor 116 to generate a feed solution for the hydrogen reactor 116 (e.g., reagent mixer 214). At 510, the reactor controller 118 can cause an amount of additional reagent to be provided to the reactor. Similar to Step 508, the reactor controller can operate additional fluid control systems to direct sufficient additional reagent to the hydrogen reactor (or other system such as the reagent mixer 214) to react with the fuel reagent during the conversion reaction. Accordingly, sufficient fuel reagent and additional reagent may be provided to the hydrogen reactor 116 to generate the amount of fuel.

At 512, the reactor controller 118 can cause the amount of fuel to be provided from the reactor to the backup power system. In particular, and similar to Steps 508 and 510, the reactor controller 118 can operate fluid control systems to direct the amount of fuel from the hydrogen reactor 116 to the backup power system 126.

At 514, the reactor controller 118 can determine whether the amount of power generated by the backup power system 126 is sufficient to meet or exceed the power deficit of the facility systems 130. In particular, the reactor controller 514 can request and receive indications of power output from the backup power system 126. Additionally, the power output of the backup power system 126 can be compared to the power deficit determined at step 502 (or step 406) to identify whether the amount of fuel was sufficient to maintain operation of the facility systems 130. Where the power output of the backup power system 126 is greater than or equal to the power deficit of the facility systems 130 (Step 514—Yes), the reactor controller 118 may proceed to Step 516. Alternatively, where the power output of the backup power system 126 is less than the power deficit of the facility systems 130 (Step 514—No), the reactor controller 118 may proceed to step 502. The power deficit determined by the reactor controller 118 may be utilized as a power threshold that the power generation and the amount of fuel is determined to meet or exceed to maintain operation of the facility systems 130.

At 516, the reactor controller 118 can request additional indications from the facility systems 130 and the primary power system 132. In particular, and at a second time after the first time where the reactor controller determined that the amount of fuel was sufficient to maintain operation of the facility systems 130, the reactor controller 118 can cause and/or receive an additional indication of power demand and an additional indication of power supply. At 518, the reactor controller 118 can determine whether the power deficit has changed for the facility systems 130. For example, the power deficit may be reduced, but not eliminated, such that an additional amount of fuel, less than the amount of fuel, is utilized to satisfy the power deficit. The reactor controller 118 can modify operation of the fluid control systems to reduce the fuel generation of the hydrogen reactor 116 to the additional amount of fuel (Step 518—Yes). Alternatively, if the reactor controller 118 determines, based on the additional indication of power supply and power demand received at step 516, that the power deficit has not changed (Step 518—No), the reactor controller may proceed to step 508 to maintain production of the amount of fuel. It should be noted that where the power deficit is eliminated by the primary power system 132, the reactor controller 118 may suspend production of the amount of fuel.

INDUSTRIAL APPLICABILITY

In a large-scale facility such as a data center, backup power can be provided by hydrogen-driven engines (or fuel cells) that consume hydrogen as fuel to provide power to the facility. The hydrogen-driven engines (or fuel cells) can provide lower carbon emissions, cleaner emergency power, and alternative fuel sources when compared to diesel gensets commonly utilized as backup power. Storing hydrogen can involve precise control schemes and maintenance of the storage tank (e.g., storage temperature and storage pressure) because liquid hydrogen must be stored at very low temperatures. Further, storage of hydrogen includes heightened concerns regarding the combustibility of hydrogen to ensure safe operation within a facility. The systems and methods of the present disclosure provide a system for generating hydrogen from methanol to satisfy a power deficit when a primary power system is unable to power facility systems. For example, the systems described herein may determine that the facility systems are operating at a power deficit and determine the amount of power that meets or exceeds the power deficit. Additionally, the systems described herein may determine the amount of hydrogen enables the backup power system to generate the amount of power for the facility systems. Further, the systems described herein may further determine the amount of fuel reagent that is converted into the amount of power by a fuel reactor. Accordingly, the complexities of storing hydrogen may be bypassed through the utilization of a conversion reactor and fuel reagents that may be consumed to produce sufficient hydrogen to power the facility systems.

As a result of the techniques described herein, the various systems of the present disclosure can store fuel reagents capable of generating hydrogen for powering facility systems. Generally, hydrogen storage requires large systems for liquifying and maintaining the cryogenic storage of hydrogen or storage of compressed hydrogen at elevate pressures. However, utilization of fuel reagents such as methanol to store hydrogen enable an effective quantity of hydrogen to be stored without the additional systems that are associated with storage of hydrogen. Rather than having to liquify hydrogen and/or process boil-off hydrogen, the systems described herein utilize a fuel reactor to produce hydrogen on demand based on the amount of power that is be generated by the backup power system. Accordingly, large quantities of hydrogen can be stored independent of the safety concerns and the storage difficulties commonly associated with storing hydrogen. Further, the fuel reagent, such as methanol, can store an effective amount of hydrogen that is greater than the actual volume utilized to store the methanol. Due to the utilization of water and/or other easily obtained co-reagents, the amount of methanol may be stored in a smaller storage volume than an equivalent amount of hydrogen. As a result, the disclosed systems are able to maintain the hydrogen supply for the backup power system the backup power source without managing the safety concerns and/or difficulties of hydrogen.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A system, comprising:
a storage tank configured to store methanol, the storage tank including an outlet valve operable to fluidly connect the storage tank with an output line;
a reagent mixer fluidly connected to the output line and a water line, the reagent mixer being configured to form a feed solution by combining methanol received via the output line and water received via the water line;
a reactor fluidly connected to the reagent mixer, the reactor being configured to:
receive the feed solution from the reagent mixer, and extract hydrogen from the feed solution;
a backup power system fluidly connected to the reactor, the backup power system being configured to receive the hydrogen from the reactor and convert the hydrogen into power; and
a controller programmed to:
determine a power demand of a facility system;
determine a power supply of a primary power system associated with the facility system;
determine, at a first time, a first power deficit equal to an amount by which the power demand of the facility system exceeds the power supply of a primary power system associated with the facility system;
determine a first amount of the hydrogen that, when supplied to the backup power system, will cause the backup power system to generate a second amount of power greater than or equal to the first power deficit;
determine, based on the first amount of hydrogen, a first amount of methanol that, when supplied to the reactor, will cause the reactor to extract the first amount of hydrogen from the feed solution;
cause the outlet valve to direct the first amount of methanol to the reagent mixer, the mixer forming a first amount of the feed solution using the first amount of methanol;
cause the reactor to:
extract the first amount of hydrogen from the first amount of the feed solution, and
direct the first amount of hydrogen to the backup power system;
cause the backup power system to generate the second amount of power using the first amount of hydrogen;
while the backup power system is generating the second amount of power, determine, at a second time, a second power difference equal to a difference between the power demand of the facility system and a combined power provided by the power supply of a primary power system and the second amount of power generated by the backup power system; and
adjust, based upon the second power difference, the amount of power generated by the backup power system.

2. The system of claim 1, further comprising a temperature sensor that is associated with the storage tank, the temperature sensor being configured to determine a storage temperature of the methanol and transmit an indication of the storage temperature to the controller.

3. The system of claim 2, wherein the temperature sensor is configured to determine the storage temperature of the methanol based on at least one of a temperature request received from the controller, a continuous temperature measurement schedule, a periodic temperature measurement schedule, or an aperiodic temperature measurement schedule.

4. The system of claim 2, wherein the controller is further programmed to:
receive the indication of the storage temperature from the temperature sensor;
determine, based at least on the indication of the storage temperature an amount of thermal energy that raises the first amount of methanol from the storage temperature to a reactor temperature associated with the reactor; and
cause a methanol heater to provide the amount of thermal energy to the first amount of methanol such that the methanol is provided to the reactor at the reactor temperature.

5. The system of claim 1, wherein the reactor is a catalyst bed reactor, the catalyst bed reactor comprising:
a reactor wall that encloses a catalyst bed of the catalyst bed reactor, the reactor wall being configured to direct the feed solution through the catalyst bed and substantially prevent the feed solution from bypassing the catalyst bed;
a reactor input that receives the feed solution from the reagent mixer and provides the feed solution to the catalyst bed; and
a reactor output that receives the first amount of hydrogen from the catalyst bed and provides the first amount of hydrogen to the backup power system.

6. The system of claim 5, wherein:
the catalyst bed reactor is configured as a continuous reactor that receives the first amount of methanol and convert the first amount of methanol into the first amount of hydrogen substantially continuously; and
the controller is programmed to cause the catalyst bed reactor to substantially continuously provide the first amount of hydrogen to the backup power system while the power demand of the facility system exceeds the power supply of the primary power system.

7. The system of claim 5, wherein:
the catalyst bed reactor is configured as a batch reactor that receives the first amount of methanol and convert the first amount of methanol into hydrogen;
the catalyst bed reactor is configured to output the hydrogen to a buffer tank; and
the controller is programmed to cause the first amount of hydrogen to be substantially continuously provided to the backup power system while the power demand of the facility system exceeds the power supply of the primary power system.

8. The system of claim 1, wherein:
if the controller determines that the second amount of power generated from the first amount of hydrogen and the power supply of the primary power system is less than the power demand of the facility system at the second time,
the controller causes a second amount of methanol to be provided to the reactor via the feed solution to generate a second amount of hydrogen, wherein the second amount of hydrogen is provided to the backup power system to generate a third amount of power that is greater than or equal to the power demand of the facility system at the second time.

9. The system of claim 1, wherein:
the controller is programmed to operate a methanol pump to direct the first amount of methanol from the storage tank to the reagent mixer; and
the controller is programmed to operate one or more valves to direct the feed solution from the reagent mixer to the reactor.

10. The system of claim 1, wherein:
the controller is programmed to determine a first amount of water that is to be provided to the reagent mixer with the first amount of methanol, the first amount of water determined to enable substantially complete conversion of the first amount of methanol into the first amount of hydrogen by the reactor; and
the controller is programmed to operate a water pump to extract the first amount of water from the water line and direct the first amount of water to the reagent mixer.

11. The system of claim 1, wherein if, at the second time, the power demand of the facility system exceeds the combined power provided by the power supply of the primary power system plus the second amount of power generated by the backup power system, the controller is programmed to increase production of hydrogen.

12. The system of claim 1, wherein if, at the second time, the power demand of the facility system exceeds the combined power provided by the power supply of the primary power system plus the second amount of power generated by the backup power system, the controller is programmed to:
determine a second power deficit equal to an amount by which the power demand of the facility system exceeds the power supply of a primary power system associated with the facility system;
determine a second amount of the hydrogen that, when supplied to the backup power system, will cause the backup power system to generate a third amount of power greater than or equal to the second power deficit;
determine, based on the second amount of hydrogen, a second amount of methanol that, when supplied to the reactor, will cause the reactor to extract the second amount of hydrogen from the feed solution;
cause the outlet valve to direct the second amount of methanol to the reagent mixer, the mixer forming a second amount of the feed solution using the second amount of methanol;
cause the reactor to:
extract the second amount of hydrogen from the second amount of the feed solution, and
direct the second amount of hydrogen to the backup power system; and
cause the backup power system to generate the third amount of power using the second amount of hydrogen.

13. A system, comprising:
a storage tank configured to store methanol, the storage tank including an outlet valve operable to fluidly connect the storage tank with an output line;
a reagent mixer fluidly connected to the output line and a water line, the reagent mixer being configured to form a feed solution by combining methanol received via the output line and water received via the water line;
a reactor fluidly connected to the reagent mixer, the reactor being configured to:
receive the feed solution from the reagent mixer, and
extract hydrogen from the feed solution;
a backup power system fluidly connected to the reactor, the backup power system being configured to receive the hydrogen from the reactor and convert the hydrogen into power; and
a controller programmed to:
determine a power demand of a facility system;
determine a power supply of a primary power system associated with the facility system;
determine, at a first time, a first power deficit equal to an amount by which the power demand of the facility system exceeds the power supply of a primary power system associated with the facility system;
determine a first amount of the hydrogen that, when supplied to the backup power system, will cause the backup power system to generate a second amount of power greater than or equal to the first power deficit;
determine, based on the first amount of hydrogen, a first amount of methanol that, when supplied to the reactor, will cause the reactor to extract the first amount of hydrogen from the feed solution;
cause the outlet valve to direct the first amount of methanol to the reagent mixer, the mixer forming a first amount of the feed solution using the first amount of methanol;
cause the reactor to:
  extract the first amount of hydrogen from the first amount of the feed solution, and
  direct the first amount of hydrogen to the backup power system;
cause the backup power system to generate the second amount of power using the first amount of hydrogen;
while the backup power system is generating the second amount of power, determine, at a second time, that the power demand of the facility system does not exceed the power supply of a primary power system associated with the facility system; and
discontinue operation of the reactor or the backup power system.

\* \* \* \* \*